United States Patent [19]

Sherman

[11] Patent Number: 4,597,313
[45] Date of Patent: Jul. 1, 1986

[54] COMPENSATED THROTTLE VALVE

[75] Inventor: James F. Sherman, Brighton, Mich.

[73] Assignee: General Motors Corporation, Detroit, Mich.

[21] Appl. No.: 523,937

[22] Filed: Aug. 17, 1983

[51] Int. Cl.⁴ .................................................. B60K 41/04
[52] U.S. Cl. ................................................. 74/861; 74/868
[58] Field of Search ................ 74/843, 844, 856, 857, 74/858, 860, 861, 862, 866, 867, 868, 878

[56] References Cited

U.S. PATENT DOCUMENTS

| | | | |
|---|---|---|---|
| 2,903,083 | 9/1959 | Kelley | 74/856 |
| 3,643,526 | 2/1972 | Thornburgh | 74/860 |
| 3,688,606 | 9/1972 | Lemieux et al. | 74/863 |
| 3,727,487 | 4/1973 | Forster et al. | 74/867 |
| 4,257,441 | 3/1981 | Iwanaga et al. | 74/867 |
| 4,283,970 | 8/1981 | Vukovich | 74/862 |
| 4,346,627 | 8/1982 | Kawamoto et al. | 74/861 |

FOREIGN PATENT DOCUMENTS

| | | | |
|---|---|---|---|
| 0043539 | 1/1982 | European Pat. Off. | 74/867 |
| 1900938 | 2/1968 | Fed. Rep. of Germany | 74/861 |
| 3107998 | 10/1982 | Fed. Rep. of Germany | 74/867 |
| 0040266 | 3/1977 | Japan | 74/868 |

*Primary Examiner*—Kenneth J. Dorner
*Assistant Examiner*—David A. Novais
*Attorney, Agent, or Firm*—Donald F. Scherer

[57] ABSTRACT

A hydraulic control for an automatic transmission has a throttle valve providing a control pressure which is used in part to determine the transmission shift pattern. The throttle valve has a control area which is normally connected to exhaust. A solenoid responsive to the energizing of a high load engine accessory is operable to close the control area exhaust thereby causing the throttle valve to acknowledge the change in engine power available for vehicle drive. The throttle valve control pressure is thus changed to provide a signal more closely related to the engine torque available.

1 Claim, 2 Drawing Figures

COMPENSATED THROTTLE VALVE

This invention relates to transmission throttle controls and more particularly to transmission controls having manually actuated throttle valves.

Prior art hydraulic control mechanisms using manual throttle valves do not provide any compensating means for affecting the throttle control pressure in response to engine power availability, unless a throttle position change is also occasioned. Therefore, in prior art devices, when a high load engine accessory, such as the air conditioning compressor, is energized, the reduced power available to drive the vehicle is not recognized in the throttle control system. In some instances, this could reduce the quality of shifting which occurs in automatic transmissions.

The present invention seeks to correct this situation by providing an additional controlling surface area on a throttle valve. The additional surface area is normally exhausted such that it is not effective to compensate or otherwise change the throttle valve output signal. The exhausting of this area is controlled by a solenoid valve which is responsive to the actuation of engine accessory drives to close the exhaust and thereby permit pressurization of the added control area. When the added control area is pressurized, a reduced throttle signal is present for a given throttle position. This reduced throttle signal will more closely approximate the engine torque and power available so that improved vehicle performance is obtained.

It is therefore an object of this invention to provide an improved throttle valve for a hydraulic control in an automatic transmission wherein the throttle valve control pressure is adjusted by a solenoid controlled pressure responsive area to reflect the change in the engine output torque, available for vehicle drive, relative to the throttle position when a high load engine driven accessory is activated.

It is another object of this invention to provide an improved throttle valve for a hydraulically controlled automatic transmission wherein the throttle valve includes a control area which is selectively pressurized by energizing a solenoid controlled exhaust port to reduce the control pressure from the throttle valve when a high load engine accessory is activated thereby adjusting the relationship between engine output torque availability and throttle valve position.

These and other objects and advantages of the present invention will be more apparent from the following description and drawings in which.

Figure 1:
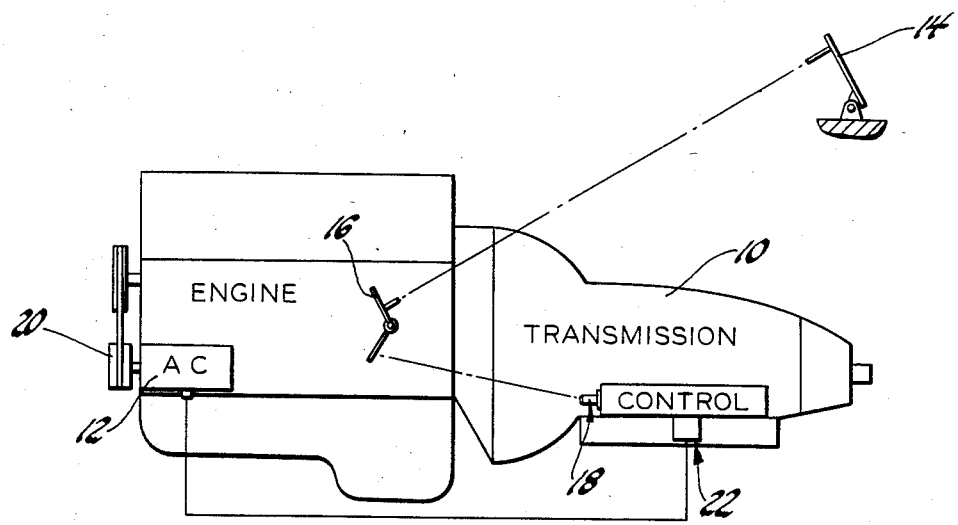
FIG. 1 is a diagrammatic view of an engine and transmission.

FIG. 1 depicts an internal combustion engine to which is drivingly connected a power transmission 10 and an air conditioning compressor 12. The engine is operated by a manual throttle pedal 14 which is connected through a linkage 16 to also operate a control valve 18 disposed in the transmission 10. The control valve 18 is commonly termed a throttle valve and is operable to produce or otherwise generate a pressure signal proportional to the engine torque available for driving the power transmission 10.

The air conditioning compressor 12 is driven through an electrically controlled pulley 20 which, as is well-known, cycles during the operation of the vehicle air conditioning system. When the air conditioning compressor is operable, the engine torque available for the power transmission 10 at a given throttle position, is reduced.

The pulley 20 includes an electrically operated clutch, the structure and operation of which is well-known. The control valve 18 has associated therewith a solenoid 22 which is responsive to the energization of the electric clutch of pulley 20. Therefore, whenever the air conditioning compressor 12 is being driven by the engine, the solenoid 22 is energized.

Figure 2:
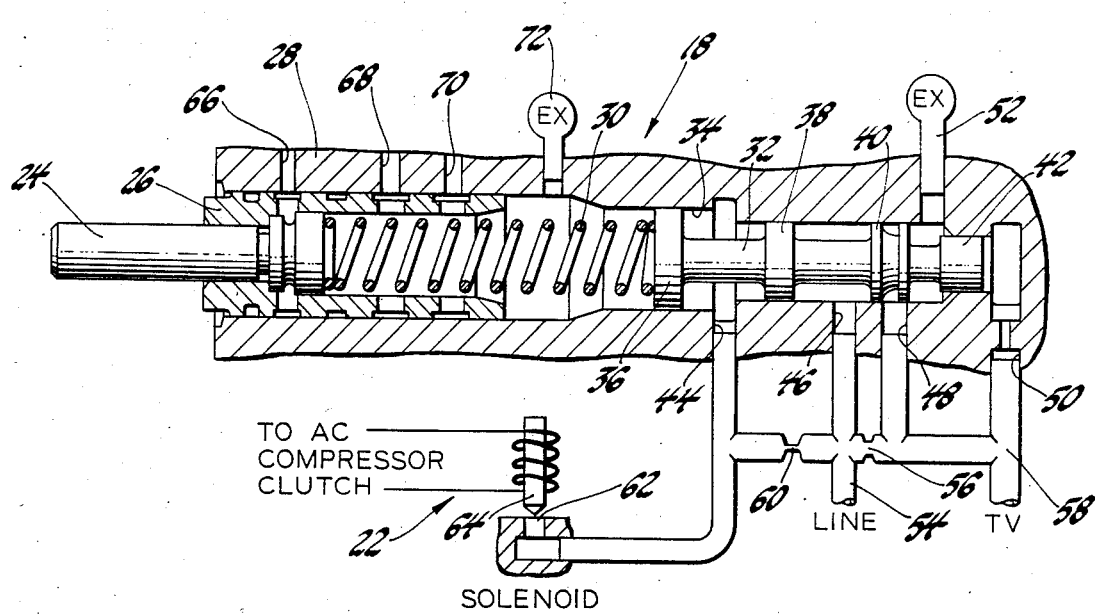
FIG. 2 is a diagrammatic view of a throttle valve used in the transmission control shown in FIG. 1.

The control valve 18, as seen in FIG. 2, includes a manual plunger 24 slidably disposed in a sleeve 26. The sleeve 26 is secured in a valve housing 28 by a pin member, not shown. The plunger 24 is in abutting relation with a compression spring 30 which also abuts the left end of a slidable valve member 32 which is disposed in a stepped valve bore 34. The valve member 32 has a large diameter land 36, two intermediate diameter lands 38 and 40 and a small diameter land 42.

The valve housing 28 has formed therein a plurality of fluid passages 44, 46, 48 and 50 which are communicating with the valve bore 34 between lands 36 and 38, between lands 38 and 40, the valve land 40, and with the right end of valve land 42, respectively. An exhaust port 52 is also connected with the valve bore 34 between lands 40 and 42.

Passage 46 is connected directly with the transmission mainline pressure passage 54 which receives pressurized fluid from a conventional hydraulic pump. This passage 54 is connected through an orifice or restriction 56 to a passage 58 which communicates with passages 48 and 50. The passage 58 is termed the throttle valve passage and contains a pressure signal which is proportional to the position of manual plunger 24.

The compression spring 30 urges the valve member 32 rightward in bore 34. As the manual plunger 24 is moved rightward by actuation of throttle pedal 14, the force in spring 30 increases. When the valve member 32 is urged rightward by spring 30, the valve land 40 moves rightward to permit fluid communication between passages 46 and 48. This permits an increase in fluid pressure in passages 48, 58 and 50, since line pressure in passage 54 is always in excess of the throttle valve pressure in passage 58.

The pressure in passage 50 operates on the right end of land 42 in opposition to the force in spring 30. When the pressure on land 42 is sufficient to overcome the force in spring 30, the valve member 32 will move leftward thereby closing communication between passages 46 and 48 so that the control pressure in throttle valve passage 58 is established. If the pressure in passage 58 exceeds the force in spring 30, the valve member 32 will be moved further leftward thereby connecting passage 48 to exhaust passage 52 thus reducing the pressure in passage 58.

In most hydraulic control systems, there is some downstream leakage which would generally require the valve member 32 to be continually moving. To reduce this movement, the restriction 56 is added to the system which will provide a controlled makeup flow to the throttle control system.

The valve land 36 and the valve land 38 cooperate to form a differential area which is connected for fluid communication with passage 44. The passage 44 is connected for fluid communication through a restriction 60 with the mainline passage 54. The passage 44 is also connected for fluid communication with the transmission sump or exhaust at end 62. Whenever the passage 44 is open at end 62, the restriction 60 is sufficiently small to prevent any pressure development in the passage 44.

The end 62 of passage 44 has associated therewith a solenoid plunger 64 which is a component of the solenoid 22. Whenever the solenoid 22 is energized, the plunger 64 is operable as a valve to close the end 62 of passage 44. When the passage 44 is closed, pressure will develop on the differential area between lands 36 and 38 due to the fluid communication through restriction 60 with the mainline passage 54. The pressure on the differential area will cause the valve member 32 to move leftward against spring 30 thereby opening the exhaust 52 such that a reduction in the pressure in the passage 58 will be occasioned. The pressure in passage 58 will be reduced until the force in spring 30 is balanced by the force on the differential area in addition to the force on the end of valve land 42. Thus, it is evident that actuation of the air conditioning compressor will result in a reduction in the control pressure found in passage 58.

As is well-known in transmission controls, the control pressure in passage 58 is effective to control shift points and in many instances, system pressure regulation. The pressure in passage 58 is preferably proportional to the torque available at the power transmission. As is evident from the above discussion, the reduction in control pressure in passage 58 is consistent with the reduction in engine torque available to the transmission whenever the air conditioning compressor 12 is energized.

The valve housing 28 also has three passages 66, 68 and 70 formed therein. The passage 66 may be connected to the passage 58, in a manner similar to that described in U.S. Pat. No. 3,840,039 issued to Shellman Oct. 8, 1974, and provides an operator assist pressure on the plunger 24. The passages 68 and 70 will be communicated with passage 66 as the plunger 24 moves progressively rightward to provide a part throttle signal and a detent signal, respectively. An exhaust connection 72 is formed in housing 28 to prevent pressure build-up in the area of spring 30.

The structure of valve 18 is similar to that used in many currently available vehicle transmissions. The difference between the prior art throttle valves and the presently disclosed throttle valve is the addition of the differential area between lands 36 and 38 and the use of a solenoid controlled exhaust so that a compensated throttle valve signal can be obtained.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. An improvement in automatic transmission controls for use with motor vehicles having cyclic engine loads caused by electrically activated accessory operation, and wherein the transmission has a throttle pressure regulator valve responsive to the vehicle throttle position to generate a pressure signal used by the transmission control to in part determine at least a ratio change shift points, said improvement comprising;

pressure responsive differential area means on said throttle pressure regulator valve for effecting a change in the pressure signal generated by said throttle pressure regulator valve; exhaust passage means for connecting said pressure responsive area means to exhaust; and electrical solenoid means including a plunger for closing said exhaust passage means from exhaust to permit a pressure increase on said pressure responsive differential area in response to an increase in engine load caused by electrical actuation of one or more of the accessories whereby the ratio change shift points will be unaffected by the engine load increase.

* * * * *